(12) United States Patent
Doi et al.

(10) Patent No.: US 8,073,323 B2
(45) Date of Patent: Dec. 6, 2011

(54) ATTACHMENT FOR USE WITH VISUAL PRESENTER

(75) Inventors: Yusuke Doi, Aichi (JP); Hiroshi Yamakose, Aichi (JP)

(73) Assignee: Elmo Co., Ltd., Aichi (JP)

( * ) Notice: Subject to any disclaimer, the term of this patent is extended or adjusted under 35 U.S.C. 154(b) by 8 days.

(21) Appl. No.: 12/656,201

(22) Filed: Jan. 21, 2010

(65) Prior Publication Data
US 2010/0245992 A1    Sep. 30, 2010

(30) Foreign Application Priority Data
Mar. 31, 2009    (JP) .................................. 2009-083937

(51) Int. Cl.
G02B 21/36    (2006.01)
G02B 23/00    (2006.01)
G02B 21/00    (2006.01)

(52) U.S. Cl. ........... 396/432; 396/544; 348/79; 359/368
(58) Field of Classification Search .................. 396/432, 396/544; 348/79, 80; 359/368
See application file for complete search history.

(56) References Cited

U.S. PATENT DOCUMENTS

| 4,381,892 A | 5/1983 | Someya |
| 5,053,794 A | 10/1991 | Benz |
| 5,225,932 A | 7/1993 | Wannagot et al. |

FOREIGN PATENT DOCUMENTS

| JP | A-2008-193391 | 8/2008 |
| WO | WO 2005/103792 | 11/2005 |

OTHER PUBLICATIONS

Search Report dated May 18, 2010 issued in the corresponding Great Britain patent application No. 1001289.6.

*Primary Examiner* — Rochelle-Ann J Blackman
(74) *Attorney, Agent, or Firm* — Posz Law Group, PLC

(57) ABSTRACT

An attachment connects an eyepiece lens tube of microscope and an imaging lens tube of visual presenter and includes a cylindrical part loosely fittable through an opening with the eyepiece lens tube, a circular receiving surface which is formed on the cylindrical part and which a distal end of the imaging lens abuts, the receiving surface having a through hole, an indication line indicative of a center of the hole, a positioning piece standing along an outer circumferential edge of the receiving surface and having an inner circumferential surface with a curvature radius substantially equal to a curvature radius of outer circumference surface of the imaging lens tube, the outer circumferential surface of the imaging lens tube, and at least three screw members which are threadingly thrust radially through a circumferential surface of the cylindrical part into the cylindrical part, the screw members being arranged equiangularly.

9 Claims, 6 Drawing Sheets

ATTACHMENT FOR USE WITH VISUAL PRESENTER

CROSS-REFERENCE TO RELATED APPLICATIONS

This application is based upon and claims the benefit of priority from the prior Japanese Patent Application No. 2009-83937, filed on Mar. 31, 2009, the entire contents of which are incorporated herein by reference.

BACKGROUND

1. Technical Field

The present invention relates to an attachment for use with a visual presenter, and more particularly to an attachment which connects a microscope and a visual presenter which includes a base, a pillar standing on the base and a camera head mounted on a distal end of the pillar and including an imaging lens tube protruding from the camera head, and in which a material such as document or model is placed beneath the imaging lens tube and imaged by the camera head, the image of document or model being produced on a monitor television or projected onto a screen by a video projector.

2. Description of the Related Art

Japanese patent application publication, JP-A-2008-193391, discloses one type of visual presenter as described above. More specifically, a visual presenter 100 comprises a base 101, a pillar 102 standing on the base 101, and a camera head 103 provided on a distal end of the pillar 102, as shown in FIG. 6. The pillar 102 of the visual presenter 100 includes an upright portion 102a upstanding on the base 101 and a horizontal portion 102b extending horizontally forward continuously from the upright portion 102a. The horizontal portion 102b has a distal end on which a cylindrical camera head 103 is mounted. An imaging lens tube 104 is provided so as to protrude from the bottom of the camera head 103.

In the above-described visual presenter 100, the material is placed beneath the imaging lens tube 104 and imaged. In one manner of using the visual presenter 100, an eyepiece lens tube of a microscope is located beneath the imaging lens tube 104 of the visual presenter 100, so that an enlarged image of an object to be inspected which is placed on a stage of the microscope is reproduced on a monitor television or the like.

It is desired that an optical axis of the imaging lens of the visual presenter correspond with an optical axis of the eyepiece lens and vice versa when an enlarged image of the object to be inspected is reproduced using the microscope and the visual presenter. However, an installation position of the microscope needs to be minutely adjusted in order that the optical axes of the visual presenter and microscope may correspond with each other, whereupon the minute adjustment of the installation position is unduly troublesome and time-consuming.

Furthermore, when the position of the microscope is adjusted so that the optical axes of the visual presenter and microscope correspond with each other, there is a possibility that a ring attached around an opening surface of the eyepiece lens tube of the microscope may contact with the imaging lens of the visual presenter thereby to damage the imaging lens.

SUMMARY

Therefore, an object of the present invention is to provide an attachment for use with the visual presenter, which can quickly obtain correspondence between the optical axes of the imaging lens of the visual presenter and the eyepiece lens of the microscope, and which can prevent the ring of the eyepiece lens tube from contact with the imaging lens of the visual presenter thereby to prevent the imaging lens from being damaged.

The present invention provides an attachment for use with a visual presenter, which connects an eyepiece lens tube of a microscope and an imaging lens tube of a visual presenter including a base, a pillar standing on the base and a camera head mounted on a distal end of the pillar and including an imaging lens tube protruding from the camera head, the attachment comprising a cylindrical part which has an upper end and a lower end with an opening and is loosely fittable through said opening with the eyepiece lens tube, a circular receiving surface which is formed on the upper surface of the cylindrical part and which a distal end of the imaging lens abuts, the receiving surface having a through hole formed in the center thereof and an outer circumferential edge, an indication line which is formed on the receiving surface and indicates a center of the through hole, a positioning piece standing along a part of the outer circumferential edge of the receiving surface and having an inner circumferential surface with a curvature radius substantially equal to a curvature radius of an outer circumference surface of the imaging lens tube, the outer circumferential surface of the imaging lens tube abutting the positioning piece, the positioning piece being formed into an arc shape in a plan view, and at least three screw members which are provided so as to be threadingly thrust radially through a circumferential surface of the cylindrical part into the cylindrical part, the screw members being arranged equiangularly.

In use of the attachment, the cylindrical part is loosely fitted with the eyepiece lens tube and fixed to the eyepiece lens tube by the three screws. In this case, the user adjusts the position of the cylindrical part while referring to the indication line so that the center of the through hole corresponds with the center or an optical axis of the eyepiece lens. The microscope attached with the attachment is placed below the camera head of the visual presenter. The position of the microscope is adjusted so that the outer circumferential surface of the imaging lens tube abuts the positioning piece. As a result, the optical axis of the eyepiece lens of the microscope corresponds with the optical axis of the imaging lens of the visual presenter and vice versa.

According to the above-described attachment, the attachment is attached to the microscope with reference to the indication line so that the center of the central hole corresponds with the optical axis of the eyepiece lens of the microscope, and thereafter, the position of the microscope is adjusted so that the imaging lens tube of the visual presenter abuts the positioning piece. Consequently, the attachment can quickly obtain correspondence between the optical axes of the imaging lens of the visual presenter and the eyepiece lens of the microscope.

Furthermore, since the eyepiece lens tube of the microscope is covered with the cylindrical part, the imaging lens of the visual presenter can be prevented from contacting the ring of the eyepiece lens tube thereby to be damaged. Additionally, since the positioning piece is formed into the arc shape in the plan view, the imaging lens tube of the visual presenter can be moved in a transverse direction so as to abut the positioning piece, whereupon the usability of the attachment can be improved.

DETAILED DESCRIPTION OF THE EMBODIMENT

Figure 1:
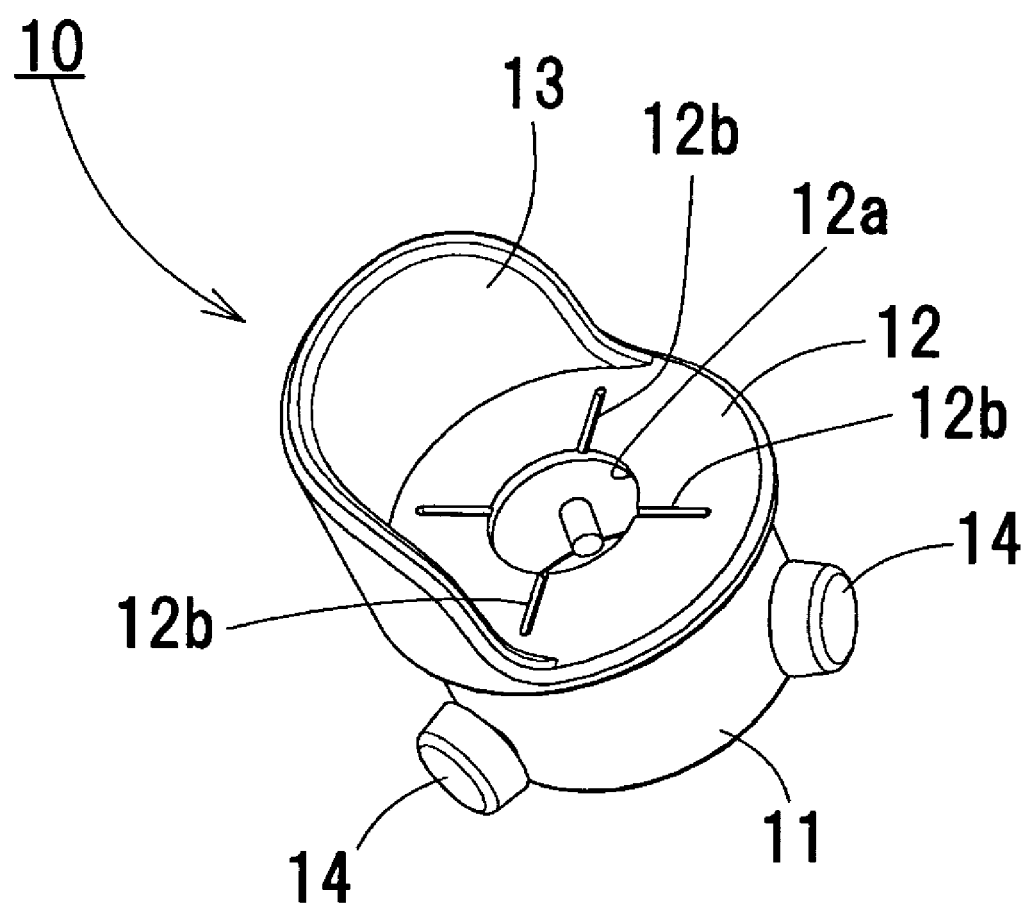
FIG. 1 is a perspective view of an attachment for use with the visual presenter in accordance with one embodiment of the present invention.
Figure 2:
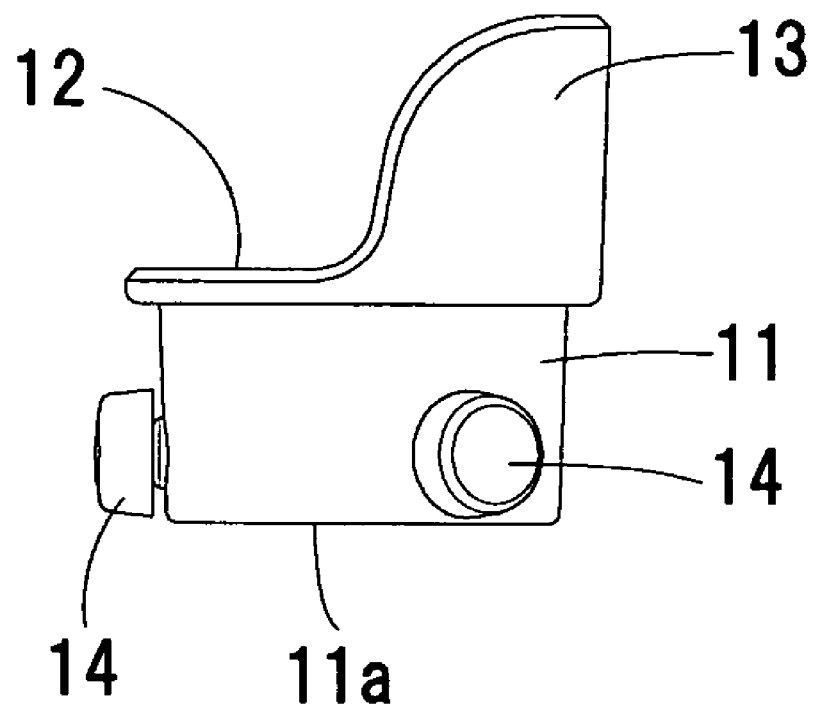
FIG. 2 is a side view of the attachment.
Figure 3:
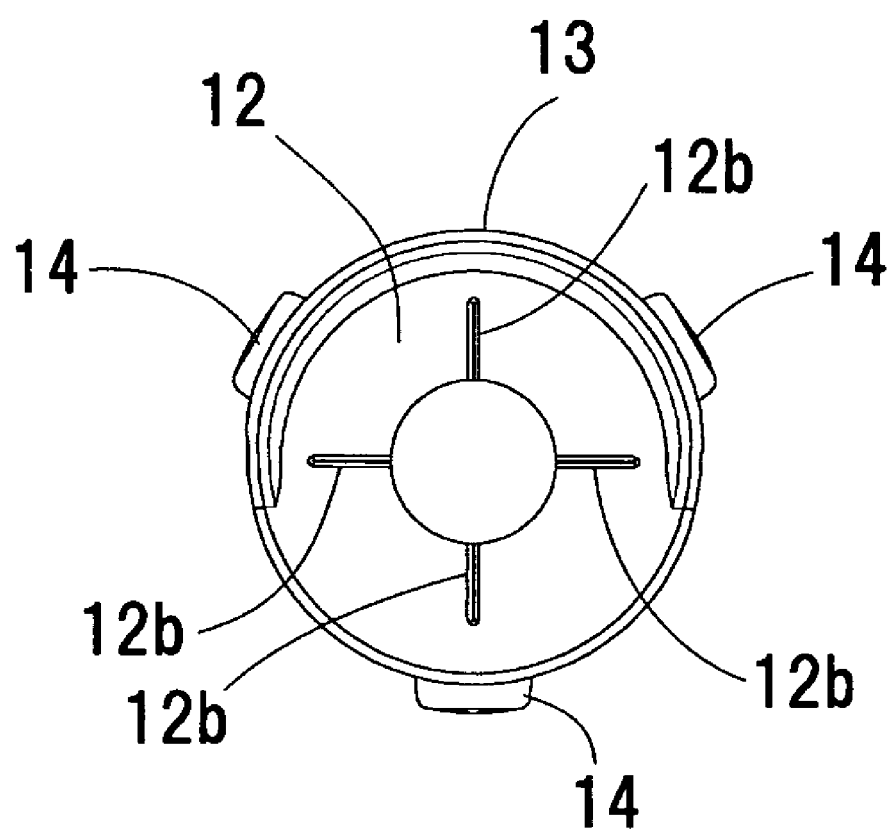
FIG. 3 is a plan view of the attachment.
Figure 4:
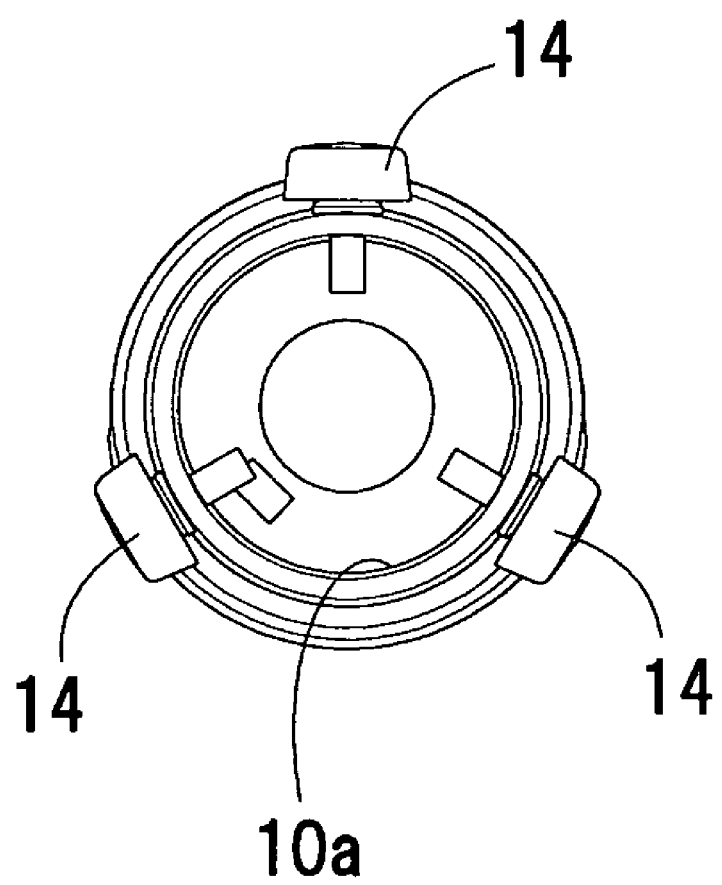
FIG. 4 is a bottom view of the attachment.

One embodiment in accordance with the present invention will be described with reference to FIGS. 1 to 5. Referring to FIGS. 1 to 4, the attachment 10 for use with the visual present is shown. The attachment 10 is molded from plastic material and includes a cylindrical part 11, a circular receiving surface 12 and a positioning piece 13 all of which are formed integrally with one another.

The cylindrical part 11 has a lower end opening 11a with a diameter which is set so that an eyepiece lens tube 21 of a microscope 20 is loosely fitted in the opening 11a. The circumferential surface of the cylindrical part 11 is formed with three screw holes arranged at intervals of 120 degrees. Three hand screw members 14 are threadingly thrust radially through a circumferential surface of the cylindrical part 11 such that a distal end of the hand screw 14 protrudes inside the cylindrical part 11.

The circular receiving surface 12 is formed on an upper end surface of the cylindrical part 11 and has a through hole 12a formed in the center thereof. The hole 12a has a diameter that is substantially the same as a diameter of the eyepiece lens tube of the microscope 20. The receiving surface 12 has an upper surface on which four indication lines 12b are provided for indicating the center of the hole 12a. The indication lines 12b are formed at intervals of 90 degrees, and an intersection point of the indication lines 12b are indicative of the center of the hole 12a.

The positioning piece 13 is formed into an arc shape in a plan view and stands along substantially a half of the circumferential edge of the receiving surface 12. The positioning piece 13 has a curvature radius that is set to be substantially equal to the radius of the outer circumferential surface of the imaging lens tube 104. The centers of the cylindrical part 11, through hole 12a and receiving surface 12 and the curvature radius of the positioning piece 13 are set so as to be aligned with one another.

Figure 5:
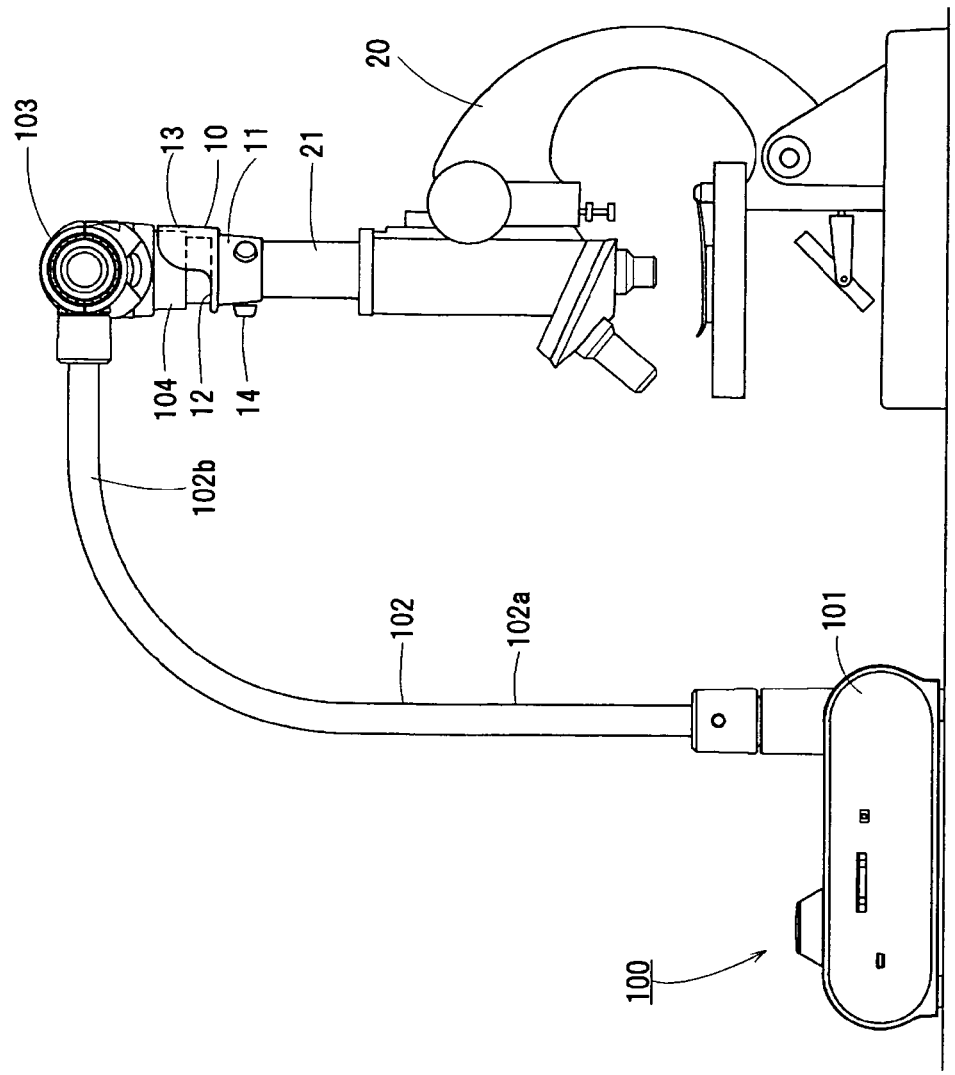
FIG. 5 shows one using manner of the attachment.
Figure 6:
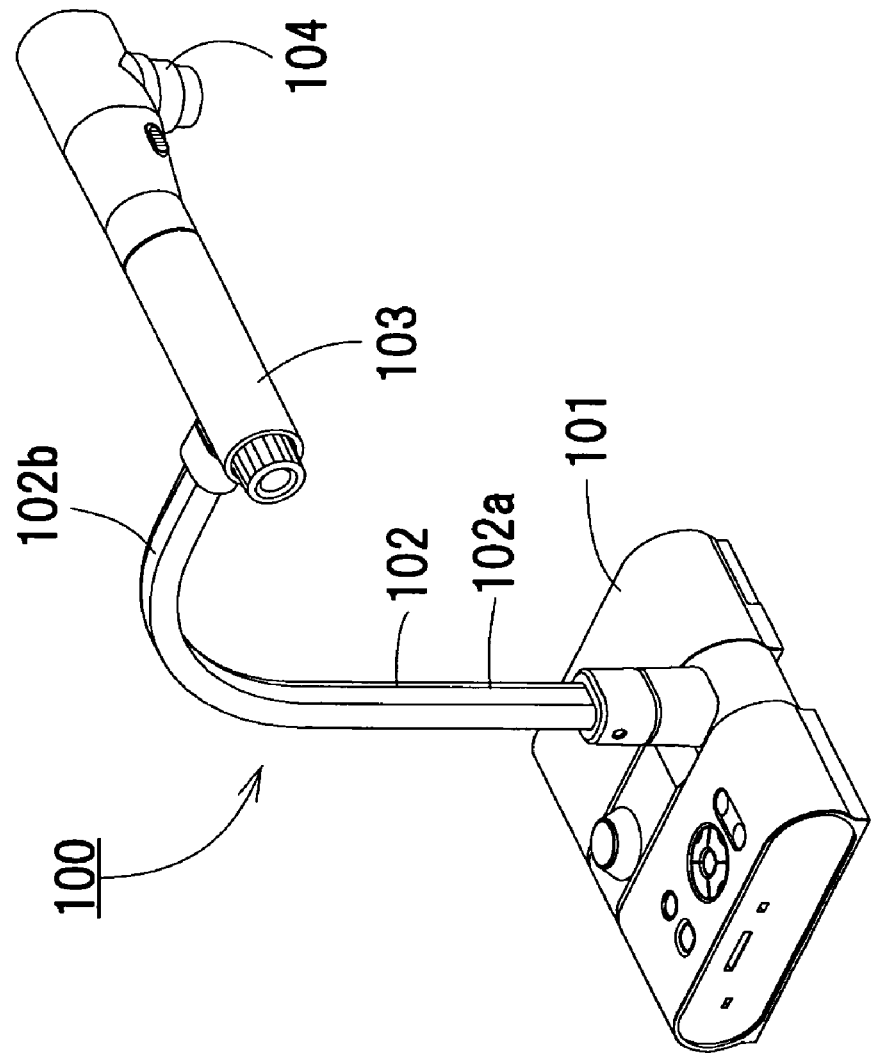
FIG. 6 is a perspective view of the visual presenter.

The attachment 10 having the above-described structure will be used in the following manner with reference to FIG. 5. Firstly, the cylindrical part 11 is loosely fitted with the eyepiece lens tube 21 of the microscope 20 to be fixed to the eyepiece lens tube 21 by three screw members 14. In this case, while referring to the indication lines 12b, the user adjusts the position of the cylindrical part 11 so that the center of the hole 12a corresponds with the center or an optical axis of the eyepiece lens. The microscope 20 attached with the attachment 10 is placed below the camera head 103 of the visual presenter 100. The position of the microscope 20 is adjusted so that the outer circumferential surface of the imaging lens tube 104 of the camera head 103 abuts the positioning piece 13 and so that the distal end face of the imaging lens tube 104 abuts the receiving surface 12. Consequently, the optical axis of the eyepiece lens of the microscope 20 corresponds with the optical axis of the imaging lens of the visual presenter 100 and vice versa.

According to the foregoing embodiment, the attachment 10 is attached to the microscope 20 with reference to the indication line 12b so that the center of the central hole 12a corresponds with the optical axis of the eyepiece lens of the microscope 20, and thereafter, the position of the microscope 20 is adjusted so that the imaging lens tube 104 of the visual presenter 100 abuts the positioning piece 13. Consequently, the attachment can quickly obtain correspondence between the optical axes of the imaging lens of the visual presenter 100 and the eyepiece lens of the microscope 20.

Furthermore, since the eyepiece lens tube 21 of the microscope 20 is covered with the cylindrical part 11, the imaging lens of the visual presenter 10 can be prevented from contacting the ring of the eyepiece lens tube 21 thereby to be damaged. Additionally, since the positioning piece 13 is formed into the arc shape in the plan view, the imaging lens tube 104 of the visual presenter 10 can be moved in a transverse direction so as to abut the positioning piece 13, whereupon the attachment 10 can be used for microscopes having eyepiece lens tubes with different sizes.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. An attachment for use with a visual presenter, which connects an eyepiece lens tube of a microscope and an imaging lens tube of a visual presenter including a base, a pillar standing on the base and a camera head mounted on a distal end of the pillar and including an imaging lens tube protruding from the camera head, the attachment comprising:

a cylindrical part which has an upper end face and a lower end with an opening and is loosely fittable through said opening with the eyepiece lens tube;

a circular receiving surface which is formed on the upper end face of the cylindrical part and which a distal end of the imaging lens abuts, the receiving surface having a through hole formed in the center thereof and an outer circumferential edge;

an indication line which is formed on the receiving surface and indicates a center of the through hole;

a positioning piece standing along a part of the outer circumferential edge of the receiving surface and having an inner circumferential surface with a curvature radius substantially equal to a curvature radius of an outer circumferential surface of the imaging lens tube, the outer circumferential surface of the imaging lens tube abutting the positioning piece, the positioning piece being formed into an arc shape in a plan view; and at least three screw members which are provided so as to be threadingly thrust radially through a circumferential surface of the cylindrical part into the cylindrical part, the screw members being arranged equiangularly.

2. An attachment, as recited in claim 1, wherein the positioning piece is configured to extend along substantially half of the outer circumferencial surface of the imaging lens tube.

3. An attachment, as recited in claim 1, wherein the arc shape is approximately half of a circle.

4. An attachment, as recited in claim 1, wherein the indication line is a straight line.

5. An attachment for use with a visual presenter, comprising:
- a cylindrical part having an upper end face and a lower end with an opening, the cylindrical part being configured to fit loosely through the opening with an eyepiece lens tube;
- a circular receiving surface that is formed on the upper end face of the cylindrical part being configured to abut a distal end of an imaging lens, the receiving surface having a through hole formed in the center thereof and an outer circumferential edge;
- one or more indication lines formed on the receiving surface and indicates a center of the through hole;
- a positioning piece standing along a part of the outer circumferential edge of the receiving surface and having an inner circumferential surface with a curvature radius substantially equal to a curvature radius of an outer circumferencial surface of an imaging lens tube, the inner circumferential surface of the positioning piece being configured to abut the outer circumferential surface of the imaging lens tube, the positioning piece being formed into an arc shape in a plan view; and
- at least three screw members that are provided so as to be threadingly thrust radially through a circumferential surface of the cylindrical part into the cylindrical part, the screw members being arranged equiangularly.

6. An attachment, as recited in claim 5, wherein the positioning piece is configured to extend along substantially half of the outer circumferenciale surface of the imaging lens tube.

7. An attachment, as recited in claim 5, wherein the arc shape is approximately half of a circle.

8. An attachment, as recited in claim 5, wherein the one or more indication lines comprise a straight line.

9. An attachment, as recited in claim 5, wherein the one or more indication lines comprise at least a first straight indication line and a second indication line perpendicular to the first indication line.

* * * * *